Feb. 14, 1950 S. J. BEGUN 2,497,654

SYSTEM FOR MAGNETICALLY RECORDING A MODULATED CARRIER IN PUSH-PULL

Filed May 29, 1945 5 Sheets-Sheet 1

INVENTOR.
SEMI JOSEPH BEGUN
BY
Pinelles & Greene
ATTORNEYS

Feb. 14, 1950 S. J. BEGUN 2,497,654

SYSTEM FOR MAGNETICALLY RECORDING A MODULATED CARRIER IN PUSH-PULL

Filed May 29, 1945 5 Sheets-Sheet 2

INVENTOR.
SEMI JOSEPH BEGUN

BY Eber J. Hyde

ATTORNEY.

Feb. 14, 1950 S. J. BEGUN 2,497,654

SYSTEM FOR MAGNETICALLY RECORDING A MODULATED CARRIER IN PUSH-PULL

Filed May 29, 1945 5 Sheets-Sheet 3

BY

INVENTOR.
SEMI JOSEPH BEGUN
Eber J. Hyde
ATTORNEY.

INVENTOR.
SEMI JOSEPH BEGUN

BY

Elmer J. Hyde
ATTORNEY.

INVENTOR.
SEMI JOSEPH BEGUN
BY
Pirles & Greene
ATTORNEYS

Patented Feb. 14, 1950 2,497,654

UNITED STATES PATENT OFFICE 2,497,654

SYSTEM FOR MAGNETICALLY RECORDING A MODULATED CARRIER IN PUSH-PULL

Semi Joseph Begun, Cleveland Heights, Ohio, assignor to The Brush Development Company, Cleveland, Ohio, a corporation of Ohio Application May 29, 1945, Serial No. 596,481

10 Claims. (Cl. 179—100.2)

This invention relates to magnetic recording and reproducing and it has among its objects a magnetic recording system in which the signal-to-noise level is greatly increased by utilizing the electric signal which is to be recorded by making on the magnetic record track two magnetic record traces corresponding to the signal, one record trace being formed by magnetically recording thereon one-half cycle of each signal wave and the other record trace being formed by recording thereon the conjugate other half cycle of each signal wave, the recorded signal being reproduced by combining the signals reproduced from the two record traces.

The foregoing and other objects of the invention will be best understood from the following description of exemplifications thereof, reference being had to the accompanying drawings wherein Fig. 1 is a diagram illustrating a magnetic recording system exemplifying one phase of the invention;

In magnetic recording, it is very desirable to keep the ratio of the signal level to the background noise as large as possible. In recording by longitudinal magnetization, the magnetic record track is first polarized or magnetized to saturation by a D. C. current. On the so prepared record track is then impressed a recording flux produced by a D. C. depolarizing or demagnetizing current on which the alternating signal current is superimposed, the D. C. polarizing current being at least as great as the maximum amplitude of the signal current. Theoretically, it would be ideal to use for recording the complete straight part of the hysteresis loop, and this would require a depolarizing current which reduces the magnetization of the signal current to zero. Under such conditions, one half cycle of the signal current will demagnetize the signal carrier to a point between the saturating and zero magnetization point, and the opposite half cycle will magnetize the record track to a point on the opposite side of the zero magnetization point. During the latter half cycle, a very large magnetic flux would have to be forced through the record track, resulting in a large leakage flux and large harmonic distortion. In order to prevent such distortion, the depolarizing current is usually reduced, and only a portion of the straight part of the hysteresis loop branch is used for recording, thereby reducing the ratio of the signal level to noise.

According to one phase of the invention, the range for recording a signal wave on a magnetic record track is greatly increased, and the signal waves are recorded at a much higher level relatively to the noise level, by subjecting one record track of a previously saturated record track to demagnetization by one half cycle of each signal current wave and subjecting another record track thereof to demagnetization by the conjugate half cycle of each signal wave. In other words, this recording method of the invention has a certain similarity to a push-pull action, and the two conjugate half waves of each signal wave cycle are recorded on two record tracks of a previously saturated magnetic record track by subjecting one track to demagnetizations produced by one half wave of two conjugate half waves of each signal wave cycle, and subjecting the other track to demagnetizations produced by the other half wave of the two conjugate half waves of each signal wave cycle. A small demagnetizing or depolarizing direct current may be superposed on the demagnetizing signal currents so as to record the two conjugate half waves on the straight part of the hysteresis loop.

Figure 1:
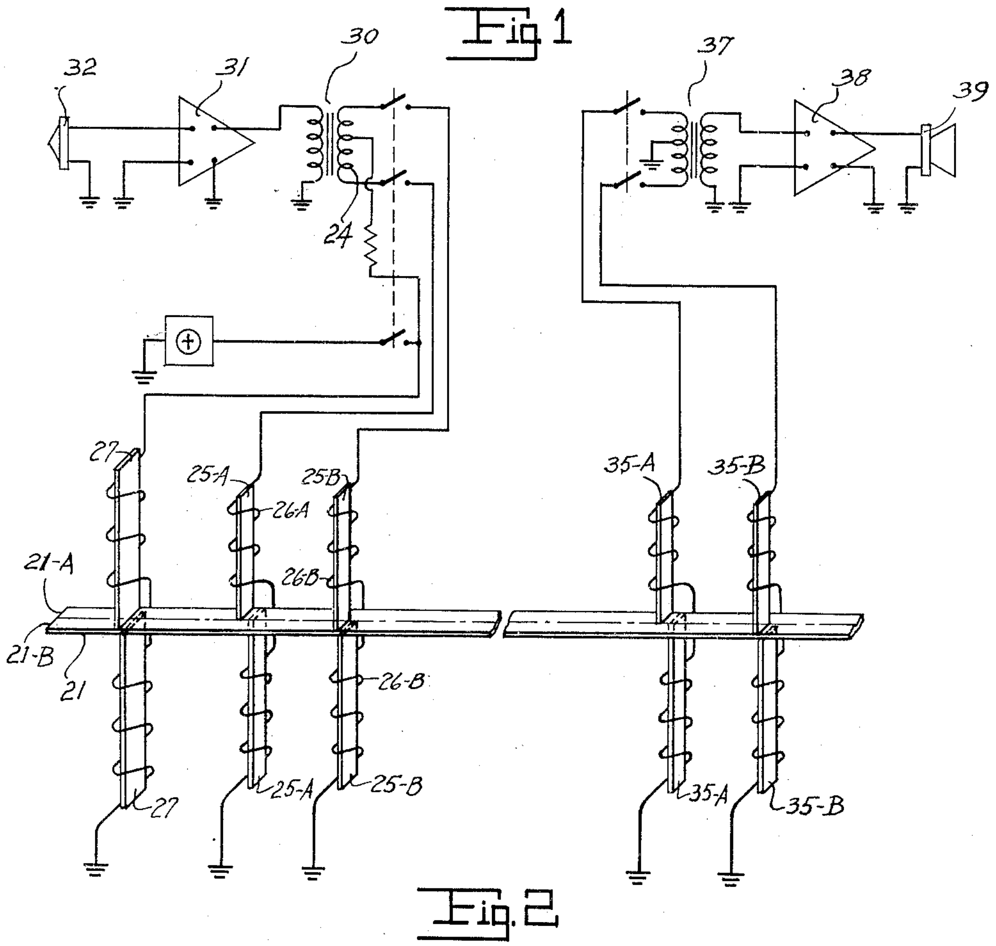

Fig. 1 illustrates one form of an arrangement for carrying out magnetic recording by such push-pull method of the invention. A record track in the form of a magnetic tape 21 has two signal tracks 21—A, 21—B impelled at a uniform speed in the direction of the arrow, from left to right. A pair of obliterating pole pieces 27 have windings 28 supplied with a direct current from a D. C. source 10+B, so that when recording, each element of the two tracks 21—A, 21—B is uniformly magnetized to saturation and that each element of the two tape tracks leaving the obliterating pole piece 27 is in the magnetic condition $B_s$ on the branch of the hysteresis loop shown in Fig. 2.

A set of two pole pieces 25—A is interlinked with an element of the record track 21—A and a similar set of poles 25—B is interlinked with an element of record track 21—B, the two curves 21—A and 21—B representing the conjugated half waves of magnetization corresponding to the conjugated half waves of the signal which is recorded.

The two sets of pole pieces 25—A, 25—B have windings 26—A, 26—B, respectively, which, for recording, are connected to the two ends of a center tap secondary winding 29 of a recording output transformer 30 having a primary winding which is supplied by signal currents from the output lead of an amplifier 31. The signals which are to be recorded may be supplied by a source, such as a microphone 32, which is connected to the primary side of the amplifier 31. The center tap of the secondary transformer winding 29 may be grounded, or, as shown, may be supplied with a small depolarizing direct current by suitably connecting it, for instance, through a current adjusting resistor to the lead from the positive supply source 10+B. The recording circuits leading to the coils of the two sets of pole pieces 25—A, 25—B are so designed that a sinusoidal signal wave voltage, indicated in Fig. 2 by curve VS impressed on the recording transformer 30 will send through the coils of the two sets of pole pieces conjugate half waves of magnetizing current indicated by the full line curve $I_s$—A and the dash line curves $I_s$—B, which produce in the record track 21—A a resultant demagnetization indicated by the dash line curve $B_r$—B.

In other words, on each record track is recorded only one half of the two conjugated half waves of each signal wave cycle, the two recorded half waves representing the entire signal wave. By sending through the coils of the two sets of pole pieces 25—A, 25—B a small depolarizing current $I_o$, the distortion due to the bent portion near point $B_s$ of the hysteresis loop is effectively suppressed. The half waves of the signal current which tend to increase the magnetization of the record track beyond the point $B_s$ have a practically negligible effect on the over-all performance of recording and reproducing by the push-pull method herein described.

When reproducing, the coils of the two sets of pole pieces 25—A, 25—B are automatically switched to the ends of a center tap primary winding of an input transformer, similar to the transformer 30 of Fig. 1, the secondary winding of which impresses its output on the amplifier input lead, the center tap of the primary winding being connected to ground to complete the two halves of the push-pull input circuit from the pole-piece coils, so as to reproduce the recorded signal wave in its original form. For the sake of simplicity, the recording arrangement of Fig. 1 is shown provided with a separate reproducing arrangement, including two reproducing heads, one reproducing head being formed by the two pole pieces 35—A and their windings for playing back the records recorded on record track 21—A, the other reproducing head being formed of two pole pieces 35—B and the windings interlinked therewith for reproducing the signals recorded on record track 21—B. The windings of the two reproducing heads 35—A, 35—B, respectively, are shown connected through a switch to the primary winding of a coupling transformer 37, the secondary windings of which are connected to a reproducing amplifier 38, the output of which is delivered to a reproducing device, such as a loudspeaker 39. The circuit connections between the windings of the two reproducing heads 35—A, 35—B are completed through the grounded side of the windings and the grounded center tap of the primary winding of the transformer 37.

As seen from Fig. 1, the magnetic push-pull recording method makes available for recording a greatly increased volume of magnetic signal energy and provides a recording system operating with a much higher signal-to-noise ratio.

In the magnetic recording and reproducing art it has heretofore been possible to record low frequencies on a magnetic recording medium, such as magnetic discs, magnetic wires, magnetic tapes and the like but it has been impossible to reproduce the recorded low frequency signal because the moving magnetized material which was in flux linkage relationship with the coil of the reproducing head could not set up sufficient change of flux to generate an electro-motive force in the reproducing coil.

One phase of the invention involves means and method of recording and reproducing signals, such as direct current, low frequencies, or high frequencies, by modulating a carrier frequency by the signal to be recorded to establish a signal modulated carrier current. The magnetic state of a magnetizable material is then altered by applying to the material, depending upon the method used, magnetizing or demagnetizing forces corresponding to the modulated carrier current. The signal is reproduced from the material by passing the magnetized material past a reproducing head to establish by flux linkage with the coil of the head an electromotive force which is substantially a facsimile of the modulated carrier current. This reproduced signal is then demodulated and current corresponding substantially to the original signal is obtained and can be applied to a transducer such as an oscillograph, oscilloscope, pen recorder, or loud speaker. The frequency of the carrier current is of such range that the carrier wave signals shall be reproducibly recordable on the magnetic recording medium, or in other words that the recording and reproducing heads are capable of recording and reproducing the carrier and its side bands.

Previous to my invention, carrier frequency recording has been used but not in a manner which would permit the reproduction of a low frequency or direct current signal. For instance, see the Alverson Patent 1,886,616 wherein, during recording, a process similar to detection takes place. Alverson uses his high frequency carrier to effectively supply the bias which is supplied by means of a direct current polarizing current in the conventional magnetic recording and reproducing systems, and therefore, only the modulating signal is left on the magnetic material. The only signal which can be reproduced by Alverson is the modulating signal, and only with the same low frequency limitations which have always existed in the art of magnetic reproduction.

The process of magnetically recording a signal on a magnetic material entails the use of an electric current to cause a varying magnetic impression to be left on the tape. The magnetic impression has a predetermined relationship to the signal being recorded and can be converted by suitable magnetic means into a signal which is a facsimile of the original signal.

The magnetic recording medium or track may be formed by a steel tape having a thickness small with respect to its width, and may be an endless belt or merely a long strip of material. In the description to follow a tape will be referred to, but it is to be understood that the means and process for recording a signal may be applied to all types of magnetic material such as wires, discs, or cylinders. The reason for choosing the tape for this description is that it is the preferred form of my invention.

In order to record on a steel tape an electric current is used to set up a magnetizing force which is proportional to the current. Therefore, as the electric current varies in accordance with the instantaneous value of the signal to be recorded, the magnetizing force impressed on the tape is proportional to the original signal. This magnetizing force which is created proportional to the signal current is measured in gilberts per centimeter and is indicated by the symbol H and the flux density induced in the steel tape by the magnetizing force H is measured in gauss and is indicated by the symbol B.

The relationship between the magnetizing force H and the resultant magnetic induction B for increasing and decreasing values of H is expressed graphically by a hysteresis loop, and for increasing values of H starting with a demagnetized tape it is expressed by a virgin magnetization curve. Every magnetic material has a particular virgin magnetization curve and hysteresis loop which identifies the magnetic characteristic of the material, and materials such as a steel tape formed by a rolling process will have different magnetization curves for different directions of magnetization, and may also have different magnetization curves at different points for the same direction of magnetization. Inasmuch as many different magnetic materials have many types of hysteresis loops, the curves and loops illustrated are intended to be representative of the general shape of hysteresis loops.

Figure 3:
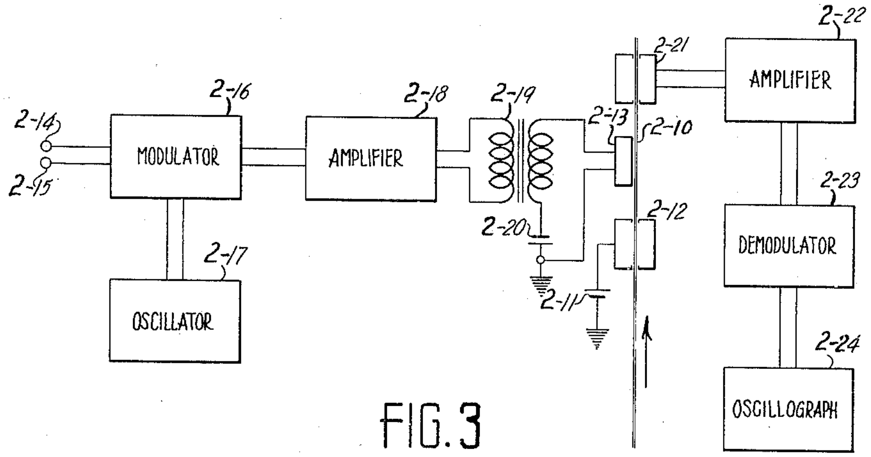
Fig. 3 is a block diagram illustrating a magnetic recording system exemplifying another phase of the invention.

Fig. 3 illustrates a form of my invention using a moving magnetic tape 2—10, in which the tape passes obliterating head 2—12 which is connected to a battery 2—11. The battery is connected to the obliterating head in such a manner that a unidirectional magnetizing force is applied to each incremental portion of the passing tape 2—10, and the strength of the magnetizing force is sufficient to saturate magnetically the passing incremental portion of the tape. This saturating process obliterates any previous magnetic record and brings each portion of the tape to a substantially uniform magnetic state. In connection with Fig. 4, which shows a typical B—H curve, $S_1$ indicates the state of saturation which prevails in each portion of the tape under the obliterating pole pieces which are magnetized by a battery 2—11 of one polarity, and $S_2$ indicates the state of saturation which prevails for an obliterating battery of the opposite polarity. Each incremental portion of the magnetic tape 2—10 which is in the obliterating head 2—12 is magnetically saturated, and as each portion of the tape 2—10 leaves the obliterating head 2—12 the flux density drops to the point of magnetic remanence R on the hysteresis curve.

The tape 2—10 then passes through a recording head 2—13 which receives a signal voltage. The signal voltage fed to the recording head is in the form of a signal modulated carrier current. The signal which it is desired to record magnetically on the tape 2—10 is applied to the input terminals 2—14, 2—15 of the recording circuit, and passes to a modulator 2—16. An oscillator 2—17 is connected to the modulator 2—16 and the output of the modulator is the carrier frequency derived from the oscillator 2—17 modulated by the signal applied at the input terminals 2—14, 2—15. It is necessary that the frequency of the oscillator be high enough that it will establish in a magnetic tape a flux having sufficient alternations per second that during the reproducing process a rate of change of flux will be obtained which is high enough to establish a reproduced signal. On the other hand, it is desirable that extremely high oscillator frequencies be avoided because the finite size of the pole piece would prevent recording.

The output of the modulator 2—16 consisting of a signal modulated carrier is amplified by the amplifier 2—18, and may be connected to the recording head 2—13 through a transformer 2—19. A polarizing battery 2—20 is connected to the secondary side of the transformer 2—19, and one side of the battery is grounded. The direction of the magnetic field established by the recording head 2—13 and battery 2—20 is opposite the direction of the magnetic field established by the obliterating head 2—12 and its battery 2—11; the magnetic force produced by head 2—13 is such that it reduces the residual magnetism remaining after the obliterating process to an optimum value such as is represented by point O in Fig. 4. The magnetizing force produced by the polarizing current derived from battery 2—20 is preferably superimposed on the magnetizing force derived from the signal modulated carrier current. As shown in Fig. 3, there is an alternating current applied to the coil of the recording head 2—13 which establishes an alternating magnetizing force which establishes in the magnetic tape 2—10 an alternating magnetic pattern whose amplitude bears a definite relationship with respect to the signal at the input terminals 2—14, 2—15. The instantaneous value of the alternating current which is applied to the recording head may be represented by the algebraic sum of the instantaneous values of the signal modulated carrier or oscillator current, and the current from battery 2—20. The current from battery 2—20 is unidirectional or direct current and will always have substantially the same value. The signal current at terminals 2—14, 2—15 may be direct current, or it may be alternating current, but the carrier current from the oscillator 2—17 is always alternating. The algebraic sum of the signal modulated carrier current and the polarizing current is always unidirectional but has an intensity which varies with the signal to be recorded. The fact that the carrier current is alternating at a fairly rapid rate makes my recording and reproducing process operable even though the signal current is a direct current.

I have mentioned before that previous processes would magnetically record a direct current or low frequency alternating current, but that the reproducing process would not pick up the recorded signal. This was because the moving magnetized material which was in flux linkage relationship with the coil of the reproducing head could not set up sufficient change of flux to generate a useable electromotive force in the reproducing coil. In the generation of electricity it is elemental that it is a changing flux with respect to time $$\left(\frac{d\phi}{dt}\right)$$

which establishes the electromotive force. This elemental concept must be carried into magnetic recording and reproducing processes. A changing flux must be present to generate an electromotive force. Accordingly, in the prior art processes when a direct current or low frequency alternating current had been used to establish a magnetic condition in a tape, and the tape was run past a reproducing head, the rate of change of flux was insufficient to generate in the coil of the reproducing head a voltage which could be utilized. In my recording and reproducing process, however, there is always present the alternations established by the alternating carrier current. Therefore, even in the worst possible case such as when a direct current signal has been recorded, there is present in the tape 2—10 a magnetic pattern which alternates according to the carrier current modulated by the direct current. When such a magnetized tape is driven past the reproducing head 2—21 the rate of change of flux $$\left(\frac{d\phi}{dt}\right)$$

is great due solely to the magnetic alternation caused by the carrier current. The reproducing head 2—21 "picks up" or re-establishes a signal which is substantially a facsimile of the recorded signal, and it is in the form of a signal modulated carrier current. This reestablished signal is amplified by the amplifier 2—22 and is rectified by the detector 2—23 or otherwise demodulated before it is applied to utilizing means such as a transducer or to the oscillograph 2—24. In my process and apparatus, the signal picked up from the moving magnetic tape 2—10 is not detected by the tape as it is in Alverson; and if the original modulating signal is desired the signal derived from the tape must be sent through the detector 2—23. It is to be remembered, however, that in case the operator can utilize an unrectified signal, the output of the amplifier can be connected directly to the oscillograph 2-24, and in such case the operator will observe a signal modulated carrier current.

Figure 4:
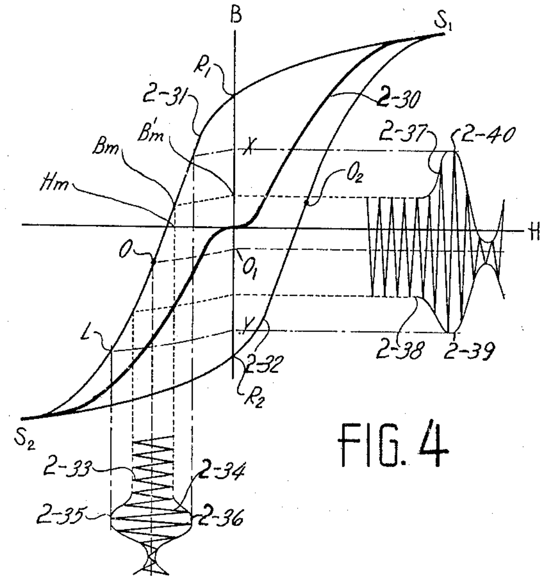
Fig. 4 is a curve diagram illustrating the principles underlying the recording system of Fig. 1.

Fig. 4 shows a virgin magnetization curve 2—30, and a hysteresis loop 2—31, 2—32 for a magnetic material. $S_1$ and $S_2$ represent regions of magnetic saturation. Depending upon the direction of the magnetic field established by the obliterating head and the battery 2—11, each incremental portion of the tape 2—10 is brought into one of the saturation ranges to prevent the past magnetic history of the magnetic material from interfering with the signal to be recorded. Suppose, for instance, the tape was saturated to $S_1$, then upon leaving the obliterating head the remnant magnetism in the magnetic tape is at a value represented by point $R_1$ on the curve 2—31. This point is on the B axis which extends through the zero point of the magnetizing force H. The polarizing or biasing current derived from battery 2—20 is slightly more than is required to demagnetize the tape and places the operating point O at an optimum point between $R_1$ and $S_2$, and on the substantially straight portion of the curve 2—31.

The unmodulated carrier current is represented by wave curve 2—33. The signal modulated carrier is represented by curve wave 2—34 which has a first envelope 2—35 and a second envelope 2—36. The biased carrier current as shown oscillates about point O and establishes magnetizing forces which, when removed from the tape, leave flux densities remaining in the tape which vary between point X and point Y. Point L is the point or zone at which the substantially straight portion of curve 2—31 changes to the curved portion which indicates saturation. Because the curve 2—31 is substantially straight the distortion introduced into the reproduced signal may be negligible, and the magnetic pattern recorded on the tape 2—10 will be in accordance with the curve 2—37. When the unmodulated carrier 2—23 is recorded it will appear as portion 2—38 of the curve 2—37, and the signal modulated carrier 2—34 having two envelopes 2—35, 2—36, when recorded will appear as having two envelopes 2—39, 2—40. It is apparent therefore, that the applicant's process does not cause a detection of the signal upon recording and reproducing the signal. The detection, if it is desired, must take place after the pickup head has reproduced the recorded modulated carrier signal from the tape.

Fig. 4 also illustrates a condition which prevails during the magnetic recording of a signal, and is due to hysteresis in the magnetic material. To explain this operation, one particular momentary value of recording current (represented by the magnetizing force $H_m$), will be analyzed. On being subjected to this momentary recording force, the magnetic condition of the tape is carried down to point $B_m$ of the magnetization curve. Upon leaving the recording head, the magnetizing force acting on the tape element drops to zero, and the magnetic state of this tape element increases along a minor ascending loop from $B_m$ to $B_m'$, where $B_m'$ now represents the final magnetic condition of the tape element. Since any wave form may be considered as a sequence of such points ($B_m$), the recording of a complex wave front may be synthesized accordingly. It has been found that the minor ascending loops introduce negligible nonlinearity. Accordingly, the usual illustration does not include the minor ascending loops, and for the sake of simplicity they have been omitted from Fig. 9.

If the polarity of the magnetic force established by the obliterating head 2—12 and its battery 2—11 is such as to saturate the tape 2—10 into the range $S_2$, then the polarity of the magnetic field established by recording head 2—13 and battery 2—20 must be opposite so that operation takes place about the point $O_2$. The signal modulated carrier 2—34 must then oscillate about point $O_2$ in order to obtain substantially distortionless recording and reproducing.

It will be apparent that even though the signal to be recorded is a direct signal, the signal reproduced is an alternating signal which establishes a high rate of change of flux in the reproducing head, and will, upon detection, be substantially the same as the original signal.

Figure 5:
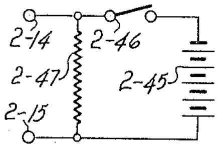
Figs. 5 and 6 are simplified circuit diagrams suitable for use in the recording system of Fig. 1.
Figure 6:
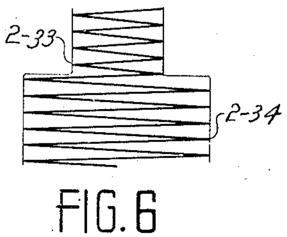

Fig. 5 illustrates a type of circuit for producing a direct current which may be applied to the input terminals 2—14, 2—15 and comprises a battery 2—45 connected through a switch 2—46 to the terminals 2—14, 2—15. A shunt resistance 2—47 may be provided. The current may be applied to the input terminals for a short period of time or for a long period of time and the oscillograph 2—24 will record the current from the battery. Fig. 6 illustrates the direct current signal modulated carrier current which would be seen in the oscillograph if the demodulator 2—23 of Fig. 3 were not present.

Figure 7:
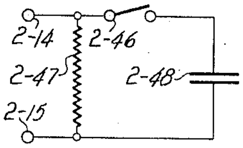
Fig. 7 is a curve diagram illustrating a carrier signal modulated by a direct current signal in a system of Fig. 1.

Fig. 7 illustrates another type of circuit for producing a form of signal current which may be used to modulate the carrier current. A condenser 2—48 may discharge through resistance 2—47 to the original input terminals 2—14, 2—15, and the discharge transient will appear on the oscillograph 2—24. If a longer period of time is required to study the condenser discharge, a device as shown, described, and claimed in my patent application "Recording and reproducing device," Serial No. 425,304, now U. S. Patent No. 2,378,388, granted June 19, 1945, may be used.

Figures 8, 9:
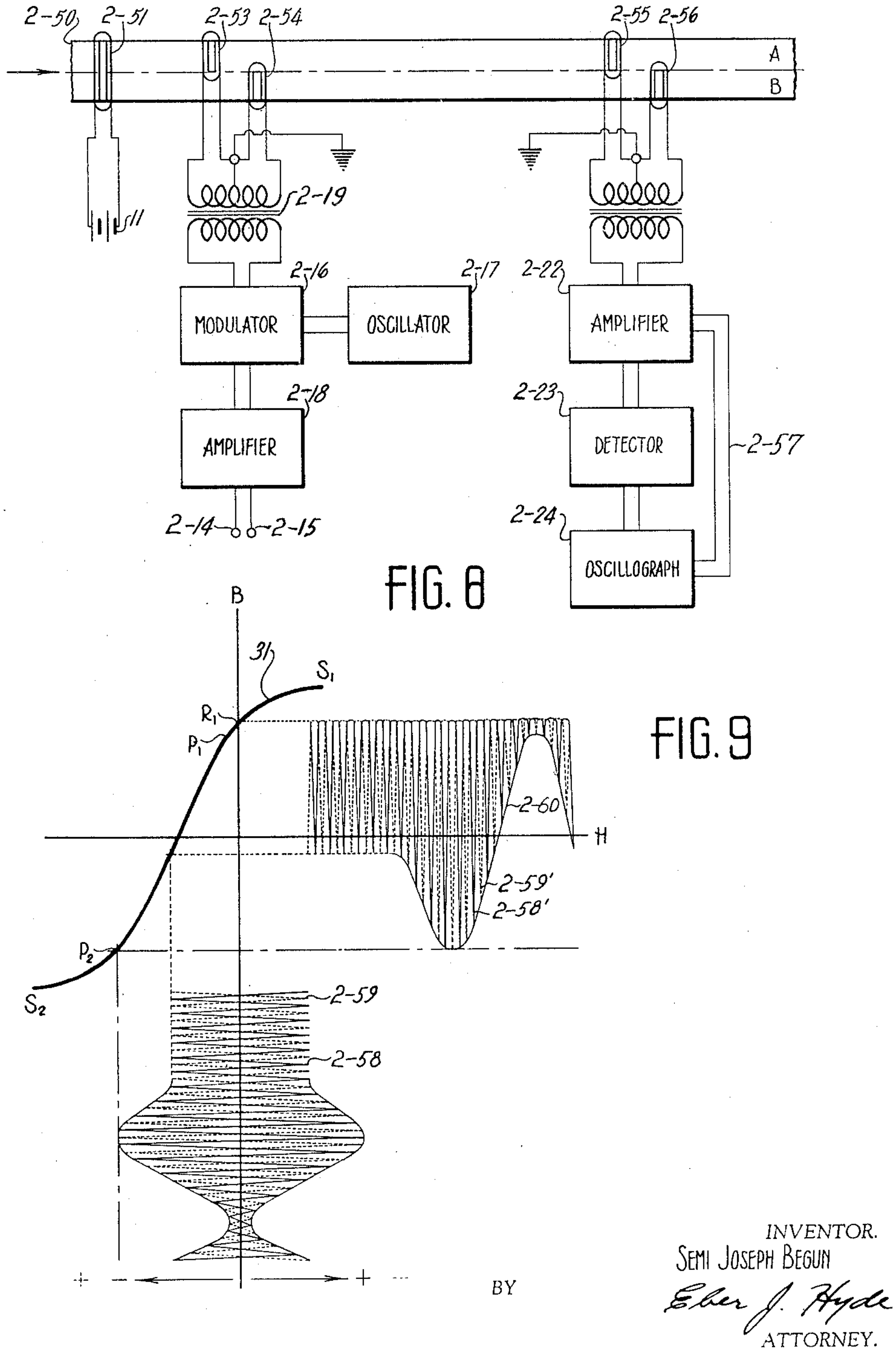
Fig. 8 is a diagrammatic view of a recording system exemplifying a further phase of the invention.
Fig. 9 is a curve diagram illustrating the operation of the system of Fig. 8.

Fig. 8 illustrates another form of my invention wherein two synchronized tapes or one tape having two recording tracks may be used. As shown only one tape is used because this obviates the problem of exact synchronization between the speeds of two tapes.

The double channel tape 2—50 moves in the direction of the arrow past a saturating head 2—51 which is wide enough to cover both recording tracks of the tape. A saturating battery 2—11 is connected to the coil of the saturating head to supply direct current which establishes in the pole piece of the head a magnetizing flux which saturates each incremental portion of the passing tape 50.

Two recording heads 2—53, 2—54, are used, and each head is adapted to record on one of the two channels A, B. The coils of the two recording heads 2—53, 2—54 are wound in opposite directions to produce oppositely directed flux. Any other means for producing oppositely directed flux may be used and still be within the scope of my invention. The signal to be recorded is received at the input terminals 2—14, 2—15, and passes through an amplifier 2—18 to a modulator 2—16. The carrier frequency which originates at the oscillator 2—17 is tuned to a frequency which can be recorded on and reproduced from the magnetic tape 2—50, and passes to the modulator 2—16 where it is modulated by the incoming signal. The signal modulated carrier current output of the modulator 2—16 is connected to the primary of the transformer 2—19, and the secondary is connected to the two recording heads 2—53, 2—54. A portion of the modulated carrier is effectively recorded on the magnetic tape by each of the heads 2—53, 2—54. The recording process is not affected by the direction of the saturation of the tape 2—50 by the battery 2—11 and head 2—51. The current supplied to the recording head 2—53 will be an alternating current due to the oscillator 2—17, and this will be true whether the signal at the input terminals is an alternating current signal or a direct current signal. The direction of the magnetizing force in the recording heads 2—53, 2—54 will change with the alternations in the signal modulated carrier current. During one half cycle of the carrier the recording head 2—53 will establish a recording force having a direction which is the same as the direction of the saturating force established by head 2—51 and will tend to saturate an incremental portion of the track A which is under it and which is already saturated thus not leaving any signal impressed on the tape. At the same instant, due to the direction in which the coil is wound, the recording head 2—54, will establish a recording force in the opposite direction; that is, it will demagnetize an incremental portion of the saturated track B which is under it thus leaving a corresponding signal impressed upon the tape. During the next half cycle of the carrier the direction of the magnetizing forces in both heads 2—53, 2—54, will be reversed and head 2—53 will exert a force which will demagnetize an incremental portion of the track A of the saturated tape 2—50, and head 2—54 will exert a force which will try to saturate an incremental portion of the track B which is already at a state of saturation. This means that each head will effectively record one-half of a cycle of the carrier current. In other words, this system is comparable to a class B amplifier, as far as the carrier alone is concerned. However, for modulating frequencies the system is comparable to class A parallel operation of an amplifier. It will be seen that in my process each recording head 2—53 or 2—54 establishes a magnetic flux which records only one-half of the modulated carrier current, and that together the two recording heads are effective to record the whole carrier, each half of the carrier being on a separate track. Accordingly, both the modulating signal and the carrier itself will be recorded. If the carrier is modulated by a signal it will establish an envelope 2—60. In reality the recorded carrier 2—58′ establishes an envelope 2—60, and the recorded carrier 2—59′ establishes another envelope 2—60. Accordingly, there is a magnetic pattern on the tape 2—50 substantially corresponding to the entire carrier current, and a line 2—60 connecting the successive peaks of the carrier cycles defines the envelope of the modulated carrier. There is one envelope 2—60 recorded on each track A and B. In Fig. 9 the two magnetic impressions resulting from the carrier frequency have been shown together. I felt that in this manner the time relationship between the effective and ineffective recording and reproducing periods of the heads 2—53, 2—54 and 2—55, 2—56 would be more clearly understood.

The distance between recording head 2—53 and recording head 2—54 is immaterial so long as there is the same distance between playback heads 2—55 and 2—56. It may be convenient to make one or more of the heads adjustable to obtain exact spacing.

Each of the magnetic reproducing heads 2—55, 2—56 will be subjected to an alternating flux corresponding to the recorded portion of the carrier which passes by it. By this process the modulated carrier can be reproduced from the tape and all signals, including low frequency alternating current signals and direct current signals, can be reproduced from the modulated carrier. The signals picked up by the reproducing heads 2—55, 2—56 are amplified by the amplifier 2—22, and are demodulated by the demodulator 2—23 before they appear at the oscillograph 2—24. A direct connection 2—57 may be provided between the amplifier 2—22 and the oscillograph 2—24 in case the operator wishes to see the signal modulated carrier current.

Fig. 9 illustrates graphically the recording process in which magnetic induction B is plotted against magnetizing force H. The line 2-31 indicates the portion of a hysteresis loop caused by a progressively increasing magnetizing force whose polarity is opposite to that of the force which produced the condition of saturation represented by point $S_1$. Between $S_1$ and $S_2$ there is a region which is substantially straight and the peak value of each cycle of the modulated carrier should establish a magnetizing force having a value which falls in this region in order that minimum distortion should be present in the envelope of the reproduced signal.

It is realized that each kind of metal has its own particular magnetization curve and hysteresis loop and that wide variations in these curves may be found for the many kinds of metals. However, among the engineers working with magnetic recording and reproducing problems it is realized that the metals used have a magnetization curve and a hysteresis loop displaying portions which may be spoken of as "substantially straight." This region is illustrated in Fig. 9 between the points or zones $P_1$ and $P_2$. It is understood that the definition of this region depends upon the material used for the magnetic element 2—50.

The magnetic tape 2—50 has been saturated to point $S_1$ by the battery 2—11, and upon the removal of the tape from the field set up by the battery 2—11 the value of the magnetism in the tape drops down to the point $R_1$. The signal modulated carrier current is applied to both of the recording heads 2—53, 2—54. Two magnetizing forces 2—58, 2—59 are shown. The force 2—58 is established by the signal current which is applied to recording head 2—53, and force 2—59 is established by the signal current which is applied to recording head 2—54. These forces have opposite directions because the coils in the recording heads 2—53, 2—54 are wound in opposite direction. The positive half of each cycle of the carrier will establish a magnetizing force in the head 2—53 but this magnetizing force will not be effective on the tape 2—50 as the magnetizing force will be trying to increase the magnetism in an already saturated tape. This same positive half-cycle will establish in recording head 2—54 a demagnetizing force because the coil in head 2—54 is wound in the opposite direction from the coil in the recording head 2—53. Therefore a signal will be left in track B of the tape corresponding to this half cycle. The half-cycle which immediately follows the positive half cycle may be spoken of as a negative half cycle. This negative half cycle will establish in the recording head 2—53 a demagnetizing force which will be effective to demagnetize a portion of the track A of the tape 2—50, and will establish a magnetizing force in head 2—54 which will tend to saturate an already saturated portion of track B. When an unmodulated carrier current is recorded on the tape 2—50, each track A and B will have portions which remain magnetically saturated, alternating with portions which are demagnetized, and the demagnetized portions will all have the same maximum values of demagnetization. When a signal modulated carrier is recorded on tape 2—50, each track A and B will have portions which remain magnetically saturated alternating with portions which are demagnetized or magnetized in the opposite direction and the amount of this effect for each cycle of the carrier will vary according to the modulating signal. The line 2—58' indicates the magnetic pattern in the tape 2—50 due to the recording head 2—53, and the line 2—59' indicates the magnetic pattern in the tape 2—50 due to the recording head 2—54. Each defines an envelope 2—60 which represents the modulating signal.

The reproducing heads 2—55, 2—56 have coils which are wound in opposite directions, and the recorded alternating flux densities induce in the coils of the reproducing heads 2—55, 2—56 an alternating current. Each reproducing head generates a current in accordance with half of the total signal recorded on the tape 2—50, and each head picks up the carrier current.

Figure 10:
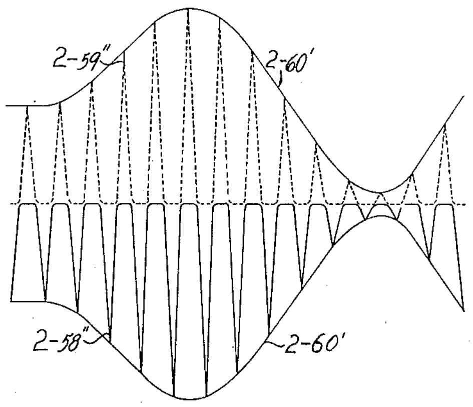
Fig. 10 is a curve diagram of the signal as reproduced by a recording system of the invention.

Fig. 10 represents the signal reproduced from the recorded signal illustrated in Fig. 9. The dotted carrier 2—59'' is reproduced by the head 2—56 to establish one half of the signal envelope, and the solid carrier 2—58'' is reproduced by the head 2—55 to establish the other half of the signal envelope. It will be seen therefore, that when combined the signal modulated carrier is substantially reproduced, and that from it a person can obtain the original signal by applying a detecting process.

Figure 11:
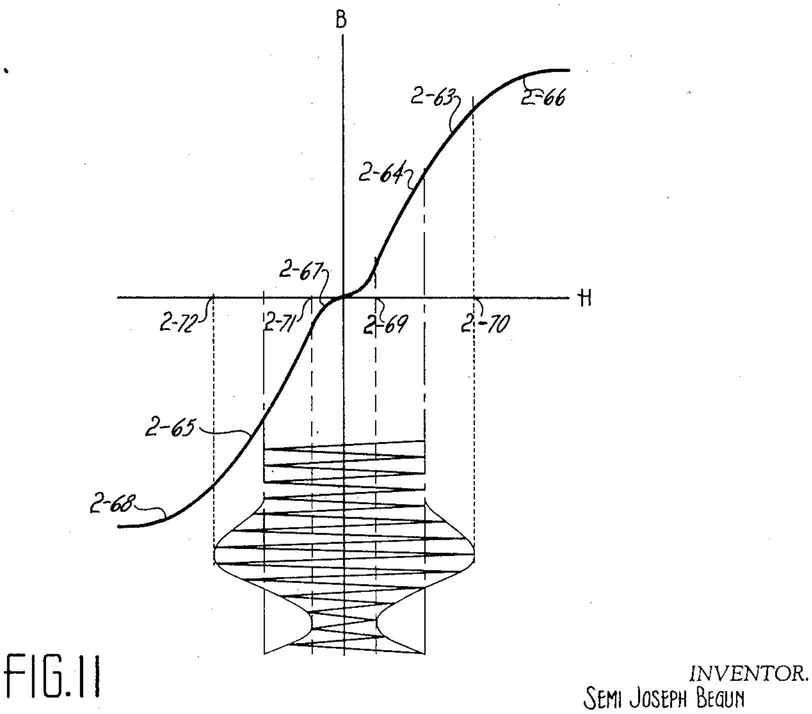
Fig. 11 is a curve diagram illustrating the principles underlying the invention.

Fig. 11 illustrates my invention in connection with magnetically recording on a demagnetized magnetic material. The process of demagnetizing the material and recording the signal by use of a modulated carrier current has been described in detail in my application for Apparatus and method for magnetic recording, Serial No. 540,667, filed June 16, 1944, now U. S. Patent No. 2,419,195, granted April 22, 1947.

The magnetic material is demagnetized by moving it through a diffuse alternating magnetic field. At one point in the field the magnetizing force is sufficient to magnetically saturate the tape, and as the tape moves away from the magnetic field the maximum values of the flux densities produced in successive alternations of the demagnetizing current gradually drop to zero. When the tape has moved out of the magnetic field it will be in substantially demagnetized condition, and subsequent magnetization by a signal current will be in accordance with the virgin magnetization curve 2—63 of the material.

A signal modulated carrier current is applied to the recording head and the value of the current is adjusted to cause the maximum magnetic flux densities in the tape to correspond to points on the substantially straight portions 2—64 and 2—65 of the magnetization curve 2—63 of the material. Distortion in the reproduced signal is reduced by preventing the maximum flux densities in the tape during each carrier cycle from corresponding to points on the curved portions 2—66, 2—67, and 2—68 of the magnetization curve of the material. This may be referred to as recording on the substantially straight portions of the curve. In recording on a substantially demagnetized tape by my modulated carrier current system, the greatest dynamic range can be obtained by adjusting the normal amplitude of the unmodulated carrier current to have a peak value which corresponds to a magnetizing force H having a value which lies substantially midway between the value of the forces corresponding to points 2—69 and 2—70 for a current of one polarity; and between 2—71 and 2—72 for a current of the other polarity. The minimum amount of distortion due to recording on the curved portion of the magnetization curve is obtained by adjusting the percentage of modulation of the carrier current to a value which is at all times below 100%: that is, with the normal peak value of the carrier current adjusted substantially midway between points 2—69, 2—70 and 2—71, 2—72, the peak value of the magnetizing force produced by any (each) cycle of the modulated carrier current will not be greater than the value of the magnetization force represented by the points 2—70, 2—72, nor less than the value of the magnetization force represented by the points 2—69, 2—71. I have found that 40 to 60 per cent modulation is satisfactory for some magnetic materials. By this process the maximum values of the flux densities in the tape for each carrier cycle correspond to points which lie only on the straight portions of the magnetization curve of the material, and therefore distortion of the signal produced from the envelope of the carrier is reduced to a minimum. The magnetizing force corresponding to the amplitude of the peak of each cycle of the modulated carrier current is always less than the value of points 2—70, 2—72, to prevent recording on the curved portions 2—66, 2—68 of the magnetization curve, and is always greater than the value of points 2—69, 2—71 to prevent recording on the curved portion 2—67 of the magnetization curve. Depending upon the material used for the endless tape the size of the curved portions 2—66, 2—67 and 2—68 varies. For each kind of tape it is possible to adjust the amplitude of the unmodulated carrier current to cause the normal peak value of each cycle to fall substantially half way between points 2—69, 2—70, and to adjust the amount or percentage of modulation of the carrier current by the signal to be recorder to cause the peak value of each cycle of the modulated carrier current to lie between points 2—69 and 2—70 for one polarity of the carrier current, and between points 2—71 and 2—72 for the other polarity of the carrier current.

In the processes represented by Figs. 4 and 9, the precent of modulation may be limited to prevent recording off of the straight portion of the magnetization curve of the material. In Fig. 4, 100 per cent modulation may be used if the greatest amplitude of the modulated carrier does not establish a magnetic force extending into the saturation range. If heavy modulation causes distortion by establishing magnetizing forces in these ranges the percentage of modulation may be reduced.

The process illustrated in Fig. 9 usually cannot include 100 per cent modulation because the point $P_1$, where distortion starts, is for most materials below the point of remanence R. When such is the case heavy modulation causes distortion in the reproduced signal. If the modulation is reduced sufficiently to cause the peak value of the lowest amplitude of the carrier current to establish magnetizing forces within the range between $P_1$ and $P_2$, the distortion due to this cause will be reduced.

The frequency response over the range covered by the carrier frequency inclusive of its sidebands should be substantially flat in the overall process of recording and reproducing if best results are to be obtained. This can be accomplished by equalization in the recording process, the reproducing process, or both if necessary.

Figure 12:
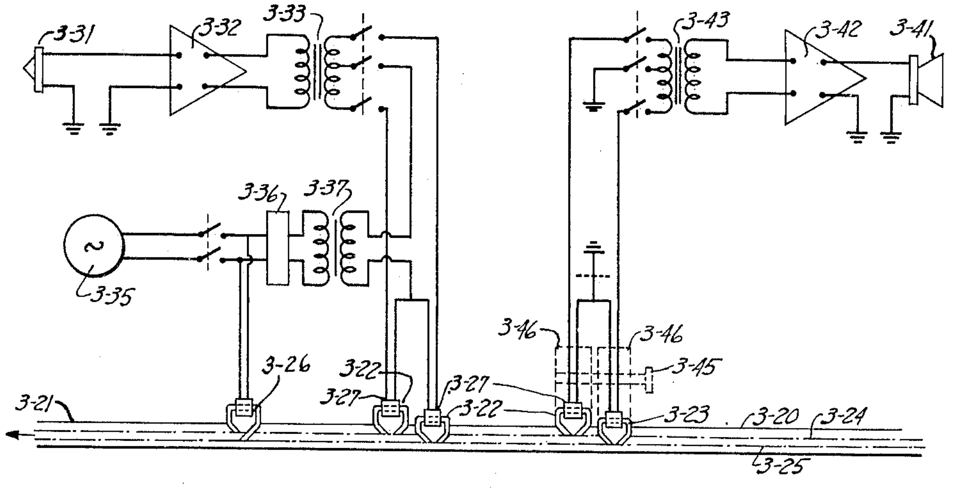
Fig. 12 is diagrammatically illustrating another magnetic recording system exemplifying the invention.
Figure 13:
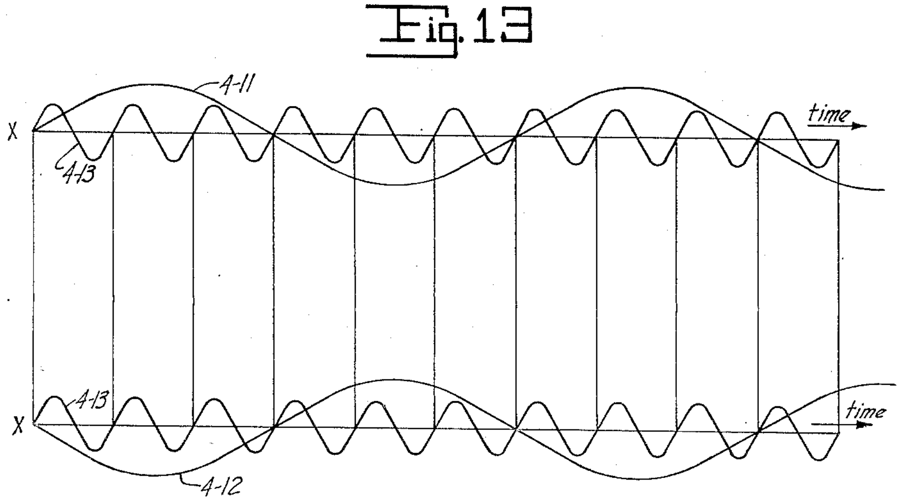
Fig. 13 is a curve diagram illustrating in a simplified manner the principles underlying the recording system of Fig. 12.

In Figs. 12 and 13 is illustrated another form of push-pull magnetic recording system exemplifying the invention. A magnetic record track, for instance in the form of a tape 3—20, is arranged to be impelled at a uniform speed, for instance in the direction of the arrow 3—21 from right to left. Magnetic record track 3—20 is arranged to cooperate with two magnetic record transducing heads 3—22, 3—23 so that the pole piece structure of the record transducing head 3—22 makes a new magnetic record along one magnetic trace 3—24 of the magnetic record track 3—20 and the pole piece structure of the other transducer head 3—23 makes a new magnetic record along another magnetic record trace 3—25 of the magnetic record 3—20. The two magnetic transducer heads 3—22, 3—23 may be of the type described in my patent application Serial No. 550,573, filed August 22, 1944, now abandoned, and they are designed for making magnetic records, either with a D. C. biasing field or with an A. C. biasing field.

There is also provided a magnetic obliterating head 3—26 which may be of the type described in my aforesaid patent application Serial No. 550,573 and is designed to subject the magnetic material of both record traces 3—24, 3—25 moving past the magnetic gap of the obliterating head 3—26 to an obliterating magnetic field which obliterates all previous records and brings the magnetic material of the two record traces 3—24, 3—25 to uniform magnetic condition.

In the recording system illustrated in Fig. 12, the record is obliterated by supplying the obliterating head 3—26 with a relatively high frequency alternating current which magnetizes the core structure of the obliterating head so as to bring each magnetic element of the two record traces 3—24, 3—25 moving past the magnetic gap of the obliterating head to a magnetically neutral condition.

A source of signal energy which is to be recorded, for instance a microphone 3—31, is connected to an amplifier 3—32 the output of which is connected through a coupling transformer 3—33 to the winding coils 3—27 of the two transducer heads 3—22, 3—23.

As indicated in Fig. 12, the secondary winding of the transformer 3—33 has a center tap so as to provide across the two halves of the secondary transformer winding two equal signal components which are 180° out of phase or in phase-opposition. The coil windings 3—22 of the two transducer heads are connected to the secondary winding of the transformer 3—33 in push-pull so that each of the two transducer heads 3—22, 3—23 has impressed thereon phase-opposed or 180° displaced signal components which are equal to each other for recording on the two traces 3—24, 3—25 corresponding magnetic records.

Figure 2:
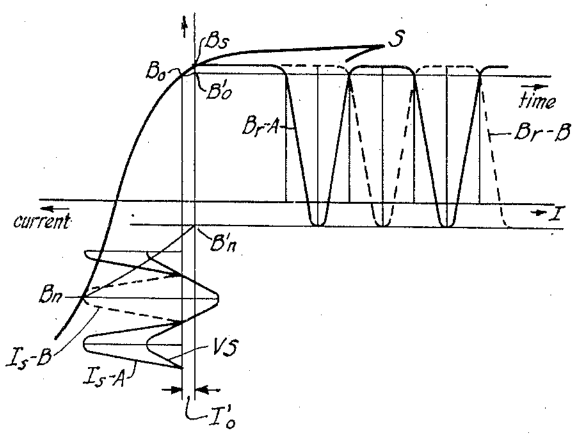
Fig. 2 is a curve diagram illustrating in a simplified manner the principles underlying the recording system of Fig. 1.

As is well-known and pointed out in my application Serial No. 550,573, filed August 22, 1944, in connection with the curves of Fig. 2 and Fig. 3, the hysteresis loop of magnetic materials, which represent the normal magnetizing characteristics of the material, collapses into a curve which has a straight magnetizing line portion passing through the origin of the magnetizing curve when magnetic material is subjected to the biasing action of an additional higher frequency alternating magnetic flux.

In accordance with the invention, a magnetic push-pull recording system of the type described above in connection with Fig. 12 is combined with means for subjecting the successive conjugate elements of the two record traces—on which the two phase-opposed equal signal components are magnetically recorded—to a superposed biasing action of an alternating magnetizing field of such character, that the signals recorded by the biasing alternating flux along the two traces are in phase and equal in amplitude and that on being reproduced from the two traces by a push-pull reproducing current, the reproduced signal components of the biasing field will cancel each other.

Fig. 12 illustrates one form of an arrangement for subjecting the successive conjugate elements of the two record traces 3—24, 3—25—on which phase-opposed, equal magnitude, components of the signals are recorded—to such an additional alternating biasing flux the waves of which are of the same phase and amplitude. The oscillator 3—35—which supplies the high frequency obliterating alternating currents to the coil of the obliterating head 3—26—is shown connected, through a control device 3—36, such as a rheostat, and an additional coupling transformer 3—37, to the mid-tap of the secondary winding of the recording current transformer 3—36 and the mid-tap connection between the two serially connected coils 3—37 of the two transducer heads 3—22, 3—23, so that each pair of conjugate magnetic elements of the two magnetic record traces 3—24, 3—25 are also subjected to the biasing action of a superposed alternating current field of the same phase and the same magnitude.

In Fig. 13, the phase and amplitude relation of the signal current components recorded on the two magnetic record traces 3—24, 3—25 is indicated in a general manner by the signal waves 4—11, 4—12 and the phase and amplitude relation of the biasing current recorded on the two traces is indicated—by relation to the same two time axes—by the two curves 4—13. For the sake of simplicity, the curves do not give any actual values, but only the general relationship. In Fig. 13, the ordinates of the two sine waves 4—11, 4—12 represents the two equal, 180° displaced components of the signal current which are recorded by the two magnetic recording heads 3—22, 3—23 on successive pairs of conjugate elements of the two magnetic record traces 3—24, 3—25. The ordinates of the two sine waves 4—13 represents the phase and amplitude relations of the additional magnetizing action to which each successive pair of conjugate elements of the two record traces are subjected by biasing alternating current supplied to the windings 2—27 of the two recording heads 3—22, 3—23.

The recorded signals are reproduced by the same or similar combination of two transducer heads 3—22, 3—23 arranged and interconnected to a reproducing circuit so that the two reproducer heads deliver two phase-opposed signal components corresponding to the signal waves 4—11, 4—12 recorded on the two record traces 3—24, 3—25, the two reproduced out of phase signal components being combined in the reproducer circuits so as to provide a signal current corresponding to the signal current which was impressed by the input source, such as microphone 3—31 on the recording amplifier 3—32; the windings of the two reproducing heads 3—22, 3—23 being so interconnected in the reproducing circuit that signals reproduced in the two reproducing heads by any magnetic records made along the two tracks by the biasing flux waves 4—13 will cancel each other.

For the sake of simplicity, there is shown in Fig. 12 an additional set of two transducer heads 3—22, 3—23 which are interconnected in a reproducing circuit including a sound reproducer, such as a loudspeaker 3—41 which is connected to the output side of an amplifier 3—42, the input side of which is connected through a coupling transformer 3—43 to the winding coils 3—27 of the two reproducing heads 3—22, 3—23, which are of the same construction and held in the same spaced relation as the two heads 3—22, 3—23 with which the signals have been recorded on the two record traces 3—24, 3—25. The secondary winding of the coupling transformer 3—43 has a mid-tap and the two winding coils 3—27 of the two transducer heads 3—22, 3—23 are connected in push-pull to the secondary winding of the coupling transformer 3—43 so that the signal components reproduced from the two magnetic traces 3—24, 3—25 by the two reproducer heads 3—22, 3—23 are combined by the coupling transformer 3—43 into a signal wave corresponding to the signal wave impressed by the recording transformer 3—33 on the recording circuit so that the signal reproduced by the sound reproducers 3—41 corresponds to the signal impressed by the microphone 3—31 on the recording amplifier 3—32.

With the windings 3—27 of the two reproducer heads 3—22, 3—23 so connected in push-pull to the coupling transformer 3—43 of the reproducing system—the signal waves of the high frequency biasing flux 4—13 picked up by the two reproducing windings will cancel each other since they are impressed in phase opposition on the secondary winding of the coupling transformer 3—43.

In other words, in a system such as described above in connection with Figs. 12 and 13, the recording circuit in combination with the two recording heads, such as the recording heads 3—22, 3—23, subjects successive conjugate elements of the two record traces 3—24, 3—25 of the magnetic record track to two equal phase opposed signal components—corresponding to the signal waves 4—11, 4—12 of Fig. 13—derives from the alternating signal current which is to be recorded, and each pair of successive conjugate elements of the two magnetic record traces being also subjected to the biasing action of a superposed alternating magnetizing field of substantially the same magnitude and phase—represented by the two in phase signal waves 4—13 of Fig. 13—so that on reproducing the signals from the record traces by a push-pull reproducing circuit including two similar magnetic reproducing heads the reproduced signals corresponding to the recorded phase opposed signal waves 4—11 will be combined in a reproduced signal corresponding to the original recorded signal, while signal waves corresponding to the recorded in phase waves 4—13 of the biasing alternating flux will be impressed on the reproducing circuits in phase opposition as they cancel each other. As a result, a recording reproducing system of the type shown in Fig. 12 makes it possible to operate such system with a biasing flux of a relatively low frequency compared to the frequency of the recorded signal, since the push-pull connected reproducing circuit automatically cancels out all signals reproduced in the reproducing circuit by flux waves recorded on the record track by the biasing flux.

As shown in Fig. 12, the two reproducing heads 3—22, 3—23 may be provided with adjusting means, indicated in dotted lines by a differential movement screw 3—45 engaging structural parts 3—46 of the two heads, so that by rotation of the adjusting screw 3—45, in one or the other direction, the relative positions of the two heads 3—22, 3—23 may be adjustably fixed so that the signals induced by the biasing field are fully cancelled in the reproducing circuit.

I claim:

1. The method of magnetically recording a signal on a magnetic material, comprising the steps of: magnetizing the material to a state of saturation; providing a carrier current; modulating said carrier current by the signal to be recorded to establish an envelope; providing first and second magnetic recording means; supplying said first magnetic recording means with signal current alternating according to said carrier current and having peak values corresponding to said envelope to cause a first portion of said magnetic material to be demagnetized in accordance with one-half of the carrier frequency wave; and supplying said second magnetic recording means with signal current alternating according to said carrier current and having peak values corresponding to the envelope to cause a second portion of said magnetic material to be demagnetized in accordance with the other one-half of the carrier frequency wave.

2. The method of magnetically recording a signal on a magnetic material which comprises the steps of: applying magnetizing forces to the magnetic material to establish in said material a substantially uniform magnetic condition; providing an alternating carrier current having a frequency in the recordable range; modulating said carrier current by the signal to be recorded to establish an envelope; providing first and second magnetic recording means; supplying said first magnetic recording means with signal current having peak values corresponding to one-half of said envelope to cause a first portion of said magnetic material to be demagnetized in accordance with one-half of the said envelope; and supplying said second magnetic recording means with signal current having peak values corresponding to the other half of said envelope to cause a second portion of said magnetic material to be demagnetized in accordance with said other half envelope.

3. The method of magnetically recording a signal on a magnetic material so that the signal may be reproduced from the magnetic material comprising the steps of: bringing the magnetic material to a substantially uniform magnetic state; providing a signal modulated carrier current having an envelope of a frequency reducibly recordable on said material; and applying at two separate areas of said uniform magnetic material cyclic magnetizing forces corresponding to the opposite half waves of said modulated carrier current so that each cycle of said magnetizing force has a recordable peak value corresponding to a portion of said envelope.

4. The method of magnetically recording a signal on and reproducing a signal from a magnetic material, comprising the steps of: magnetizing the material to a state of saturation; providing a carrier current, modulating said carrier current by the signal to be recorded to establish an envelope; applying to a first portion of said magnetic material demagnetizing forces having successive peak values corresponding to a portion of said envelope of the modulated carrier current; applying to a second portion of said magnetic material demagnetizing forces having successive peak values corresponding to another portion of the said envelope of the modulated carrier current; establishing a signal which is substantially a facsimile of the recorded signal; and applying said signal to utilizing means.

5. In carrying on magnetic record transducing operations by magnetic flux interlinkage between windings of a magnetic record transducer structure and elements of a magnetic record track, the process including the steps of: bringing the magnetic material of the record track to a substantially uniform magnetic state; and utilizing electric energy of a signal wave to be recorded for magnetically recording on said track two magnetic record traces, one trace having recorded thereon one-half cycle of the recorded signal wave and the other trace having recorded thereon the other half cycle of the recorded signal wave.

6. In carrying on magnetic record transducing operations by magnetic flux interlinkage between windings of a magnetic record transducer structure and elements of a magnetic record track, the process including the steps of: bringing the magnetic material of the record track to a substantially uniform magnetically-saturated state; and utilizing an electric signal wave for recording on said track two magnetic record traces corresponding to said signal wave, one record trace being produced by demagnetization of the magnetic material of the trace by one-half cycle of each signal current wave and the other record trace being produced by demagnetization of the magnetic material of the trace by the conjugate half cycle of each signal wave.

7. In carrying on magnetic record transducing operations by magnetic flux interlinkage between windings of a magnetic record transducer structure and elements of a magnetic record track, the process including the steps of: bringing the magnetic material of the record track to a substantially uniform magnetic state; utilizing electric energy of a signal wave to be recorded for magnetically recording on said track two magnetic record traces, one trace having recorded thereon one-half cycle of the recorde dsignal wave and the other trace having recorded thereon the other half cycle of the recorder signal waves by combining the signals reproduced from each record trace.

8. In carrying on magnetic record transducing operations by magnetic flux interlinkage between windings of a magnetic record transducer structure and elements of a magnetic record track, the process including the steps of: bringing the magnetic material of the record track to a substantially uniform magnetically-saturated state; utilizing an electric signal wave for recording on said track two magnetic record traces corresponding to said signal wave, one record trace being produced by demagnetization of the magnetic material of the trace by one-half cycle of each signal current wave and the other record trace being produced by demagnetization of the magnetic material of the trace by the conjugate half cycle of each signal wave; and reproducing the recorded signals by combining the signals reproduced from each record trace.

9. In a magnetic record transducing system: permanently magnetizable record means having two magnetic record traces; record transducing means including means for bringing the magnetic material of said traces to a uniform magnetic condition; signal input means including carrier current supply means and signal modulator means for supplying desired modulated carrier electric signals from a single signal source; said record transducing means including a first and a second magnetic transducing element associated with said two record traces respectively for recording magnetic signals on said two traces during relative movement between said transducing elements and said recordin medium, each transducing element having a predetermined positional relationship to the other; said transducing elements being connected to said input means for supplying to each of said transducer elements different complementary signal parts of said desired signals so as to magnetically record on said two record traces different complementary magnetic record wave patterns corresponding to said complementary signal parts; means for reproducing from said record wave patterns recorded on said two record traces two complementary electric output signals substantially corresponding to the complementary signal parts; and a single output circuit for combining said two complementary output signals reproduced from said two magnetic record traces, and supplying a composite signal substantially corresponding to the signals supplied by said source.

10. In a magnetic record transducing system: permanently magnetizable record means having two magnetic record traces; record transducing means including means for bringing the magnetic material of said traces to a uniform magnetic condition; signal input means including carrier current supply means and signal modulator means for supplying desired modulated carrier electric signals from a single signal source; said record transducing means including a first and a second magnetic transducing element associated with said two record traces respectively for recording magnetic signals on said two traces during relative movement between said transducing elements and said recording medium, each transducing element having a predetermined positional relationship to the other; said transducing elements being connected to said input means for supplying to each of said transducer elements opposite complementary half-cycle parts of each signal wave of said desired signals so as to magnetically record on said two record traces different complementary magnetic record wave patterns corresponding to said complementary half-cycle parts; means for reproducing from said record wave patterns recorded on said two record traces two complementary electric output signals substantially corresponding to the complementary half-cycle parts; and a single output circuit for combining said two complementary output signals reproduced from said two magnetic record traces, and supplying a composite signal substantially corresponding to the signal supplied by said source.

SEMI JOSEPH BEGUN.

REFERENCES CITED

The following references are of record in the file of this patent:

UNITED STATES PATENTS

| Number | Name | Date |
|---|---|---|
| 832,328 | Lieb | Mar. 17, 1908 |
| 1,886,616 | Alverson | Nov. 8, 1932 |
| 2,272,821 | Roys | Feb. 10, 1942 |
| 2,304,633 | Farnsworth | Dec. 8, 1942 |

FOREIGN PATENTS

| Number | Country | Date |
|---|---|---|
| 621,263 | Germany | Nov. 4, 1935 |
| 805,434 | France | Nov. 19, 1936 |

Certificate of Correction

Patent No. 2,497,654 February 14, 1950

SEMI JOSEPH BEGUN

It is hereby certified that errors appear in the printed specification of the above numbered patent requiring correction as follows:

Column 17, line 43, for the word "reducibly" read *reproducibly*; line 55, after "current" strike out the comma and insert instead a semicolon; column 18, line 32, for "recorde dsignal" read *recorded signal*; line 34, for "recorder" read *recorded*; same line, after "signal" insert *wave; and reproducing the recorded signal*; line 69, for "recordin" read *recording*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*